United States Patent [19]

Shively et al.

[11] 3,926,320

[45] Dec. 16, 1975

[54] APPARATUS AND METHOD FOR SELECTING AND TRANSFERRING A STACK OF LAMINATIONS FOR AN ELECTRIC MOTOR OR THE LIKE

[75] Inventors: Lawrence A. Shively; Robert P. Hoy, both of Dayton, Ohio

[73] Assignee: Mechaneer, Inc., Dayton, Ohio

[22] Filed: June 6, 1974

[21] Appl. No.: 477,056

[52] U.S. Cl. ............................ 214/8.5 C; 29/211 L
[51] Int. Cl.² .......................................... B65G 59/02
[58] Field of Search .......... 214/650 R, 8.5 R, 8.5 A, 214/8.5 C, 8.5 D, 8, 10.5 R, DIG. 1, 152; 29/203 L, 211 L

[56] References Cited
UNITED STATES PATENTS

| | | | |
|---|---|---|---|
| 2,119,561 | 6/1938 | Smith | 214/8 X |
| 2,350,273 | 5/1944 | Decker | 214/8 X |
| 2,842,838 | 7/1958 | Macchione | 29/203 L |
| 2,875,909 | 3/1959 | Babicu et al. | 214/8.5 R X |
| 2,949,200 | 8/1960 | Haag | 214/8.5 A X |
| 2,973,108 | 2/1961 | Gable | 214/8 |

FOREIGN PATENTS OR APPLICATIONS

| | | | |
|---|---|---|---|
| 553,436 | 2/1958 | Canada | 214/DIG. 1 |

*Primary Examiner*—Frank E. Werner
*Attorney, Agent, or Firm*—Jacox & Meckstroth

[57] ABSTRACT

A rotary index table supports a plurality of circumferentially spaced vertical magazines into which are loaded corresponding supply stacks of motor laminations. The table is indexed to position each magazine at a station where a retractable stack support member projects into the magazine. The support member is elevated by a screw jack to compress the supply stack of laminations against a surface formed by an adjustable nut member on a pick-off unit supported above the magazine by a transfer arm. The pick-off unit has an expandable collet which depends from the nut member into the laminations, and the collet has tapered peripheral surfaces which converge to form a sharp edge spaced a predetermined distance below the nut member. After a supply stack of laminations is elevated against the nut member with a predetermined pressure, the collet is expanded by actuation of a fluid cylinder so that the pick-off unit selects a predetermined stack height of compressed laminations. The pick-off unit is then elevated and indexed on a vertical axis to transfer the selected stack of laminations to a motor assembly station.

14 Claims, 3 Drawing Figures

U.S. Patent   Dec. 16, 1975   3,926,320
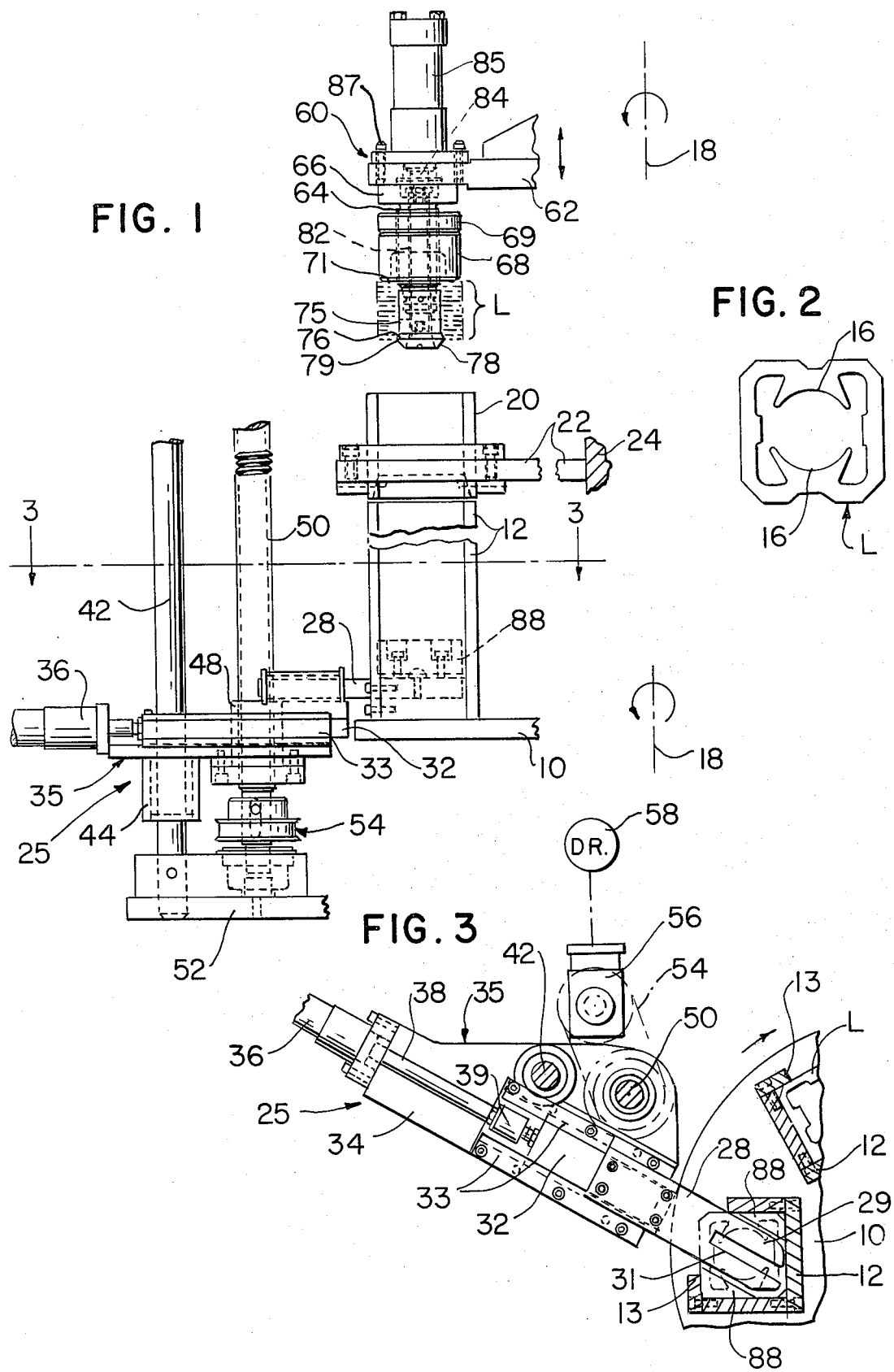

APPARATUS AND METHOD FOR SELECTING AND TRANSFERRING A STACK OF LAMINATIONS FOR AN ELECTRIC MOTOR OR THE LIKE

BACKGROUND OF THE INVENTION

In the automatic assembly of either the stator or the rotor of an electric motor or generator, it is common to select a stack of laminations of a predetermined height from the bottom of a hopper which encloses a supply stack of laminations. Due to the fact that the thickness of the laminations varies slightly and the fact that the number of laminations within each selected stack depends on the downward force exerted by the supply stack of laminations within the hopper, a series of successively selected stacks of laminations will vary in weight or mass. However, since the power output of an electric motor or generator is a function of the steel or "iron" within the stator and/or rotor laminations, it is desirable to minimize the variation in the mass of steel within the laminations so that the electric motors produced from an automatic assembly line have substantially a uniform power output.

SUMMARY OF THE INVENTION

The present invention is directed to an improved machine or apparatus for successively selecting and transferring stacks of laminations of a predetermined height and of substantially uniform weight or mass. In general the apparatus of the invention provides the features of compressing a supply stack of laminations to a substantially constant predetermined pressure which may be adjusted and for successively selecting partial stacks of the compressed laminations to a precise stack height which may also be conveniently and precisely adjusted.

More specific features and advantages of the invention will be apparent from the following description, the accompanying drawing and the appended claims.

BRIEF DESCRIPTION OF THE DRAWINGS

FIG. 1 is a fragmentary elevational view of apparatus for successively selecting and transferring stacks of motor laminations and which is constructed in accordance with the invention;

FIG. 2 is a plan view of a typical stator lamination which is handled by the apparatus shown in FIG. 1; and FIG. 3 is a fragmentary section of the apparatus taken generally on the line 3—3 of FIG. 1.

DESCRIPTION OF THE PREFERRED EMBODIMENT

Referring to the drawing, a circular horizontal index table 10 supports a plurality of circumferentially spaced vertical magazines 12 each of which has a generally square cross-sectional configuration and is interrupted along one corner by a vertically extending slot 13. Each of the magazines 12 is adapted to receive a supply stack of sheet metal laminations such as the generally square stator lamination L shown in FIG. 2. Each of the laminations L has a pair of arcuate surfaces 16 defining a center opening, and each supply stack of laminations is carried by and loaded into a magazine 12 by a T-bar carrier (not shown). A typical T-bar carrier consists of a flat vertical strip which has a lower end secured to a cross strip or base. The vertical strip extends upwardly through the aligned center openings of the laminations and maintains the laminations in precise vertical alignment during transporting and loading.

The index table 10 is supported for rotation on a vertical axis 18 for successively positioning each of the magazines 12 and a corresponding supply stack of laminations to a transfer station. At this station, each magazine 12 is positioned directly under a stationary magazine extension or guide member 20 (FIG. 1) having a cross-sectional configuration conforming to that of each magazine 12. The stationary guide member 20 is rigidly supported by an arm 22 which forms part of a main frame 24.

Also located at the transfer station is an elevating unit 25 which is adapted to elevate each supply stack of laminations within its corresponding magazine 12 located at the transfer station. The elevating unit 25 includes a support member 28 which has a fork-like or bifurcated outer end portion 29 defining a slot 31. The support member 28 is mounted on a horizontal plate 32 which is supported for sliding movement by a pair of tracks 33 mounted on a horizontal plate or platform 34 of a carriage 35. A fluid or hydraulic cylinder 36 is secured to the platform 34 and includes a piston rod 38 which is secured to the plate 32 by a coupling 39. As is apparent from FIG. 3, when the piston rod 38 and the plate 32 are extended, the outer end portion 29 of the support member 28 projects into the adjacent magazine 12 through the corresponding slot 13. When the piston rod 38 and the plate 32 are retracted by actuation of the cylinder 36, the support member 28 is withdrawn or retracted from the path of the magazines 12 so that the table 10 may be indexed on the vertical axis 18.

The carriage 35 is supported for vertical movement by a vertical guide rod 42 which extends through a cylindrical anti-friction ball bearing confined with a bushing 44 secured to the bottom of the platform 34. The platform 34 also supports a cylindrical nut member 48 which has an internal helical thread for receiving a mating vertical screw member 50. The lower end portion of the guide rod 42 is secured to a base 52 which forms a part of the main frame 24, and the base 52 also confines a bearing for rotatably supporting the lower end portion of the vertical screw member 50. A V-belt drive 54 connects the lower end portion of the screw member 50 to the output shaft of a right angle gear box 56 (FIG. 3). The input shaft of the gear box 56 is driven by a reversible hydraulic motor 58 which is schematically shown in FIG. 3.

A lamination transfer or pick-off unit 60 is positioned above the stationary guide member 20 and is mounted on one end of a transfer arm 62 which is supported for rotation on the vertical axis 18. The opposite end of the arm 62 supports another diametrically opposed pick-off unit 60 (not shown) and the transfer arm 62 is also supported for vertical movement for reasons which will be explained later. Each of the pick-off units 60 includes a tubular bushing 64 which has external threads and includes an upper flange portion 66 secured to the lower surface of the corresponding end of the transfer arm 62. A set of annular nuts 68 and 69 are threaded onto the bushing 64, and the lower nut 68 has a flat annular surface 71 which is normal to the vertical supply stack of laminations within the magazine 12 located below the guide member 20. The lower end portion of the bushing 64 supports a split-type tubular collet 75 which has a set of tapered surfaces 76 and 78 converging to form a sharp peripheral edge 79.

An elongated actuating rod 82 extends vertically through the tubular collet 75 and the tubular bushing 64 and has an upper end portion coupled to the piston rod of a fluid actuated linear motor or cylinder 85. The cylinder 85 has a base flange which is secured to the upper surface of the corresponding end of the transfer arm 62 by a set of screws 87. The actuating rod 82 has a lower end portion which is tapered or frustoconical in configuration. When the actuating rod 82 and the piston rod 84 are retracted by actuation of the cylinder 85, the split collet 75 is expanded so that the peripheral edge 79 moves radially outwardly to engage the inner surfaces 16 of the laminations.

The above described apparatus operates in the following manner. A series of supply stack of laminations L are successively placed within each of the vertical magazines 12 at a loading station (not shown). Each supply stack of laminations rests upon two triangular corner blocks 88 (FIG. 3) which are positioned diagonally opposite corners of the bottom of each magazine 12. Each supply stack of armatures is loaded into each magazine 12 by a corresponding T-bar carrier, as mentioned above, and when the bottom lamination engages or seats on the corner spacer blocks 88, the T-bar carrier drops downwardly by approximately one inch. The table 10 is then indexed to present a supply stack of laminations directly under the guide member 20. The support member 28 is extended outwardly into the magazine and between the corner spacer blocks 88 (FIG. 3) by actuation of the cylinder 36. The slot 31 within the slide member 28 provides for receiving the vertical strip of the T-bar carrier which is used for loading the supply stack of laminations into the magazine.

After the support member 28 is extended, the hydraulic motor 58 is actuated in one direction so that the support member 28 is elevated. The supply stack of laminations moves upwardly within the magazine 12 and the guide tube 20 into which the pick-off unit is lowered. After the uppermost lamination engages the annular surface 71 of the nut member 68, the continued upward movement of the support member 28 compresses the supply stack of laminations to a preselected pressure when the hydraulic motor 58 stalls. At this point, the hydraulic cylinder 85 is actuated to expand the collet 75 so that the outer peripheral edge 79 engages the surfaces 16 of the supply stack of laminations. The expanded peripheral edge 79 separates the stack of laminations and confines a predetermined stack height of laminations between the expanded peripheral edge 79 and the surface 71.

The Pick-off unit 60 is then elevated and rotated or indexed 180° so that the selected stack of laminations are carried or transferred by the pick-off unit 60 to a diametrically opposed station where a motor housing or shell is positioned, and the other or empty pick-off unit 60 is positioned above the guide tube 20. The transfer arm 62 is then lowered so that the selected stack of laminations are pressed into the stator housing, and the empty retracted collet 75 of the other pick-off unit 60 is lowered into the supply stack of laminations within the guide tube 20.

The motor 58 is again energized to elevate the supply stack of laminations, and the cycle is repeated so that another stack of laminations to a predetermined height is selected by the pick-off unit 60. After a magazine 12 is emptied by elevation of the support member 28 to the guide member 20, the support member is retracted horizontally, and the motor 58 is reversed so that the carriage 35 is lowered to its lowermost position shown in FIG. 1. While the carriage 30 is being lowered, the table 10 indexes to present another supply stack of laminations to the loading station.

From the drawings and the above descriptions, it is apparent that the apparatus of the present invention provides desirable features and advantages. For example, the apparatus is effective to compress each supply stack of laminations to a predetermined constant pressure before the cylinder 85 of the pick-off unit 60 is actuated so that the stacks of laminations which are selected and transferred by each pick-off unit 60 are of substantially uniform weight or mass. Furthermore, the selected stacked height may be conveniently adjusted simply by adjusting the nut 68 and the lock nut 69 which changes the precise spacing between the surface 71 and the expandable peripheral edge 79 of the collet 79. The compression pressure for each supply stack of laminations may also be adjusted simply by adjusting the pressure at which the hydraulic motor 58 stalls.

In addition, the arrangement and construction of the apparatus enables several functions to be performed simultaneously. For example, the carriage 35 is adapted to be lowered while the table 10 and transfer arm 62 are independently indexed. The construction and location of the elevating mechanism 25 in relation to the index table 10 and the magazines 12, also provide for a vertically compact arrangement of the apparatus. As indicated above, while stator laminations L are shown for purpose of illustration, it is to be understood that the apparatus may also be used for selecting and transferring predetermined stacks of rotor laminations from a supply stack of laminations.

While the method and form of apparatus herein described constitute a preferred embodiment of the invention, it is to be understood that the invention is not limited to the precise method and form of apparatus described, and that changes may be made therein without departing from the scope and spirit of the invention as defined in the appended claims.

The invention having thus been described, the following is claimed:

1. Apparatus for selecting a predetermined stack of laminations for a motor or the like, comprising guide means adapted to receive a supply stack of laminations, a pick-off unit positioned adjacent said guide means and including means forming a surface, a pick-off member projecting from said surface and having movable means positioned a predetermined distance from said surface for engaging the supply stack of laminations, means for compressing the supply stack of laminations against said surface with a predetermined pressure, said pick-off unit including means for actuating said pick-off member after the supply stack of laminations is compressed against said surface for retaining a selected stack of compressed laminations on said pick-off unit, and means supporting said pick-off unit for predetermined movement to transfer the selected stack of laminations.

2. Apparatus as defined in claim 1 wherein said pick-off member comprises an expandable collet adapted to project into the center of the supply stack of laminations, and power actuated means for expanding said collet to effect engagement of the selected stack of laminations.

3. Apparatus as defined in claim 2 wherein said collet has tapered peripheral surfaces converging to form a relatively sharp peripheral edge spaced a said predetermined distance from said surface, and said power actuated means comprise a fluid actuated cylinder.

4. Apparatus as defined in claim 1 wherein said pick-off unit is positioned above a substantially vertical supply stack of laminations and said surface is positioned substantially horizontally, said means for compressing the supply stack of laminations against said surface comprise a support member for the supply stack of laminations, and power actuated means for elevating said support member.

5. Apparatus as defined in claim 4 wherein said guide means for said supply stack of laminations, comprise a substantially vertical magazine having a substantially vertical slot, said support member projects into said magazine through said slot, and said means for elevating said support member comprises a motor driven screw jack having a substantially vertical screw.

6. Apparatus as defined in claim 4 including a rotary index table having a plurality of said substantially vertical magazines in a circumferentially spaced relation and supported for rotation on a substantially vertical axis, and means for moving said support member generally horizontally from a first position projecting into one of said magazines and a second position retracted from said magazine to provide for indexing said table.

7. Apparatus as defined in claim 4 including a stationary guide member positioned below said pick-off unit and above the stack of laminations.

8. Apparatus for selecting a predetermined stack of laminations for a motor or the like, comprising a substantially vertical magazine adapted to receive a supply stack of laminations, a pick-off unit positioned above said magazine and including means forming a substantially horizontal surface, an expandable collet member depending from said surface and having tapered peripheral surfaces converging to form a peripheral edge spaced a predetermined distance below said surface, said collet member adapted to project downwardly into the center of the supply stack of laminations, means for elevating the supply stack of laminations and for compressing the laminations against said surface on said pick-off unit with a predetermined pressure, and power actuated means for moving said collet member between a collapsed position and an expanded position for retaining on said pick-off unit a selected stack of laminations after the supply stack of laminations is compressed.

9. Apparatus as defined in claim 8 wherein said means for elevating the supply stack of laminations, comprise a support member positioned within said magazine, and power operated means for elevating said support member with a substantially predetermined force.

10. Apparatus as defined in claim 9 wherein said power operated means comprise a screw jack supporting said support member, and reversible fluid motor means for actuating said screw jack.

11. Apparatus as defined in claim 9 including an index table supported for rotation on a vertical axis and supporting a plurality of circumferentially spaced said magazines, each said magazine has a generally vertically extending slot, a support member, and power actuated means for moving said support member generally horizontally between an extended position projecting into said slot of each magazine and a retracted position to provide for indexing said table.

12. Apparatus as defined in claim 8 wherein said pick-off unit is supported by an arm rotatable on a substantially vertical axis.

13. A method of selecting a stack of laminations for an electric motor or the like, comprising the steps of placing a supply stack of laminations within guide means, compressing the supply stack of laminations with power operated means to a predetermined pressure against a surface of an adjacent pick-off unit having a movable pick-off member, actuating said pick-off member with power operated means after the supply stack of laminations is compressed against said surface to retain a predetermined selected stack of laminations on said pick-off unit, and moving said pick-off unit with power operated means for transferring the stack of laminations retained by said pick-off unit.

14. A method of selecting a stack of laminations for an electric motor or the like from a supply stack, comprising the steps of placing the supply stack of laminations within generally vertical guide means, elevating the supply stack of laminations with power operated means and compressing the stack against a surface of a pick-off unit having an expandable collet edge depending from said surface into the supply stack of laminations, expanding the collet with power operated means after the laminations are compressed for retaining on said pick-off unit a predetermined stack of laminations disposed between said surface and said collet edge, and moving said pick-off unit with power operated means for transferring the retained stack of laminations.

* * * * *